US006846536B1

(12) United States Patent
Priesnitz et al.

(10) Patent No.: US 6,846,536 B1
(45) Date of Patent: Jan. 25, 2005

(54) LASER-MARKABLE SHEATHING

(75) Inventors: Ulrich Priesnitz, Coburg (DE); Reiner Schneider, Ebersdorf (DE)

(73) Assignee: CCS Technology, Inc., Wilmington, DE (US)

( * ) Notice: Subject to any disclaimer, the term of this patent is extended or adjusted under 35 U.S.C. 154(b) by 150 days.

(21) Appl. No.: 09/665,760

(22) Filed: Sep. 20, 2000

Related U.S. Application Data

(63) Continuation of application No. PCT/DE99/00818, filed on Mar. 19, 1999.

(51) Int. Cl.[7] ............................ H01B 7/00; B29D 23/00

(52) U.S. Cl. ............. 428/36.91; 428/35.7; 174/120 SR; 174/120 C

(58) Field of Search ............................... 428/34.9, 35.7, 428/36.91; 174/120 SR, 120 C, DIG. 8

(56) References Cited

U.S. PATENT DOCUMENTS

| | | | |
|---|---|---|---|
| 4,307,047 A | 12/1981 | Edinger et al. | 264/25 |
| 4,391,764 A | 7/1983 | Edinger et al. | 264/25 |
| 4,425,390 A * | 1/1984 | Changani et al. | 156/253 |
| 4,808,966 A | 2/1989 | Ferlier et al. | 338/214 |
| 4,865,198 A * | 9/1989 | Butler | 206/459.1 |
| 6,031,457 A * | 2/2000 | Bonkowski et al. | 283/72 |
| 6,187,390 B1 * | 2/2001 | Seeger et al. | 427/255.31 |

FOREIGN PATENT DOCUMENTS

| | | |
|---|---|---|
| DE | 2323799 | 11/1974 |
| DE | 3147230 A1 | 6/1983 |
| FR | 2617325 | 6/1987 |
| GB | 2215116 A | 9/1989 |

* cited by examiner

*Primary Examiner*—Rena L. Dye

(57) ABSTRACT

The laser-markable sheathing comprises a carbon-blacked inner PE layer with a soot proportion of 2.5±0.5% by weight and an outer PE layer 0.05 to 0.2 mm thick. The outer PE layer completely absorbs the laser radiation (λ=532 nm) used for the marking, and the inner layer beneath it remains intact. A largely carbon-free, foamlike structure which greatly scatters incident light serves as an abrasion-proof marking. The sheathing is suitable for cable cores, fiber-optic cable strands, and the like.

20 Claims, 1 Drawing Sheet

LASER-MARKABLE SHEATHING

CROSS-REFERENCE TO RELATED APPLICATION

This is a continuation of copending International Application PCT/DE99/00818, filed Mar. 19, 1999, which designated the United States.

BACKGROUND OF THE INVENTION

Field of the Invention

The sheath of an electrical or optical communications cable is intended to protect the cable core, made up of stranding elements (optical waveguide strands, copper strands, dummy elements), the support and tension elements, and the wound wrapping that may be present, against mechanical, thermal and chemical influences as well as against moisture. In communications cables to be laid outdoors, the sheath usually comprises carbon-blacked polyethylene PE (with or without a barrier layer), since this easily processed plastic has approximately constant dielectric properties over a wide temperature range and withstands all the mechanical and chemical stresses that typically occur.

Marking the cable sheath with numbers, letters, symbols and so forth can be done during extrusion of the sheath, for instance using a marking wheel. With the aid of the marking wheel, a white plastic powder is applied, in a distribution that corresponds to the desired marking, to the still-hot, carbon-blacked cable sheath. The white powder is fused to the cable sheath by the residual heat that is still present.

Plastics can be marked substantially more quickly and more flexibly by irradiation with a laser probe. See, for instance, Hans-Robert Kohler, "Lasertechnologie und Anwendung" [Laser Technology and Application], Vulkan Verlag, Essen, German, 1993, p. 199–205; and German published patent application DE 31 47 230 A1. Depending on the laser power, the outer plastic layer is locally melted, foamed or evaporated, and its surface or structure varied accordingly.

In the irradiated region, a color change occurs, if a pigment admixed with the plastic is selectively destroyed or burned with the aid of a laser probe adapted to a maximum absorption of the pigment. See, for instance, the magazine LASER 4/87, p. 34–36; and German patent DE 30 44 722 C2.

In sum, carbon-blacked cable sheaths are typically marked using a marking wheel. Those cable sheaths typically have a high proportion of soot of up to 2.5±0.5 weight % and they are provided with a white, although not very abrasion-proof, marking with the marking wheel. The technique of laser labeling, which in principle can also be employed, results in removal of material and thus damages the cable sheath. Moreover, the resultant engraving is only poorly visible, because of the lack of contrast. The substantially more-flexible technique of laser labeling is therefore not currently being used, because the engraving created by removing material can be seen only with difficulty because of the lack of contrast.

SUMMARY OF THE INVENTION

The object of the invention is to provide a cable sheathing and to a related method of marking the cable sheathing with photon radiation which overcomes the above-noted deficiencies and disadvantages of the prior art devices and methods of this general kind. The primary object is to provide sheathing that is markable by irradiation with photons, and in particular laser-markable, for instance for elongated or strandlike objects (cable cores of all kinds, in particular cores of current-carrying cables or electrical or optical communications cables). The sheathing should be such that a readily apparent, abrasionproof marking is created on its surface in contactless fashion.

With the above and other objects in view there is provided, in accordance with the invention, a sheathing article, comprising:

a first layer of a first material containing a first proportion of a dye, and bounding an interior;

a second layer adjacent the first layer and bounding an exterior, the second layer having a marking face adapted to be marked by irradiation with photons, and the second layer being formed of a second material and containing, at least inside the marking face, a second proportion of the dye smaller than the first proportion of dye, the second proportion of dye being dimensioned to cause a color change upon irradiation with photons.

In other words, the disadvantages of the prior art are overcome by using the sheathing of the invention as the core casing. Since the comparatively thin outer layer of the sheathing, which has a lesser proportion of soot, completely absorbs the incident laser radiation, the inner layer beneath it that performs the protective function remains intact. The abrasion-proof marking created in the outer layer appears as a white structure against a black background.

In accordance with an added feature of the invention, the second material is translucent or transparent for the radiation used for marking.

In accordance with an additional feature of the invention, the second proportion of dye and/or the thickness of the second layer is adjusted such that the second layer completely absorbs the radiation used for marking.

In accordance with another feature of the invention, the dye in the first and/or second layers is soot or graphite. Preferably, the carbon content in the second layer is in a range from 0.2 to 0.8% by weight, and particularly from 0.2 to 0.5% by weight, and the thickness of the second layer is in a range from 0.01 to 1.0 mm, particularly from 0.05 to 0.2 mm.

In accordance with a further feature of the invention, the proportion of the carbon material in the first layer is in a range from 1 to 3% by weight.

In accordance with an advantageous feature of the invention, the first layer and the second layer are formed of the same material. Preferable materials for the layers include thermoplastic and/or viscoelastic materials and an elastomer.

In accordance with again a further feature of the invention, the first layer and the second layer are welded, glued, or joined together by an adhesion promoter.

With the above and other objects in view there is furthermore provided, in accordance with the invention, a sheathing which separates an interior from an exterior, and which has an exterior layer:

the exterior layer is transparent or translucent to a radiation used for marking the exterior layer, and contains a proportion of a dye (soot or graphite); and a dimension of the exterior layer (thickness of the exterior layer and/or the proportion of the dye) is selected such that the exterior layer absorbs the radiation used for marking completely, and a color change results within an irradiated region upon irradiation.

The proportion of the dye is preferably at least 0.2% by weight and at most 0.8% by weight, and the thickness of the exterior layer is between 0.01 and 1.0 mm, in particular between 0.05 to 0.2 mm.

In accordance with a concomitant feature of the invention, the first material, the second material, and/or the material of the exterior layer have stabilizers and/or aging protectants admixed therewith.

Other features which are considered as characteristic for the invention are set forth in the appended claims.

Although the invention is illustrated and described herein as embodied in a sheathing, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
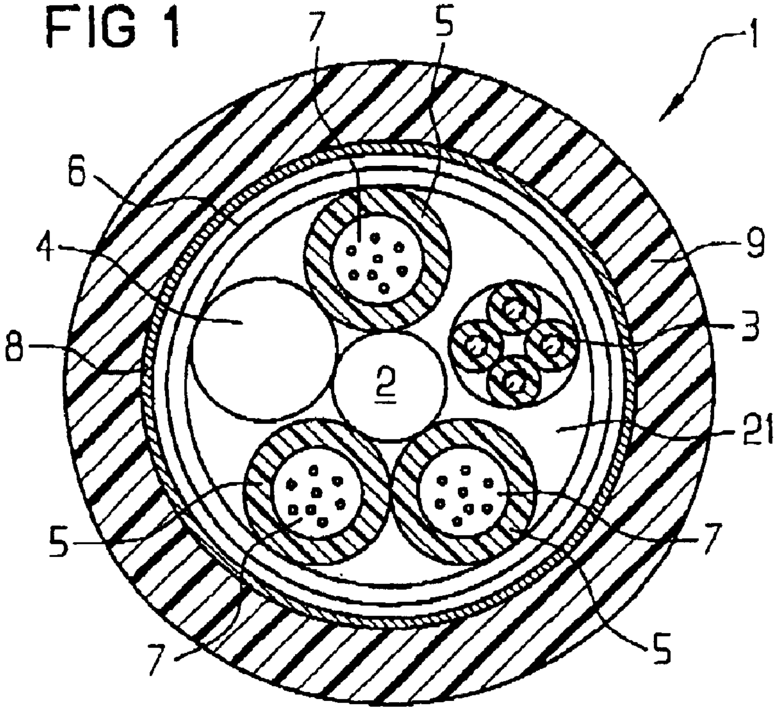
FIG. 1 is a cross-section taken through a communications cable specifically suited for external applications.

Referring now to the figures of the drawing in detail and first, particularly, to FIG. 1 thereof, there is seen a core of a communications cable 1 which comprises a central element 2 (for kink prevention and/or tension relief), made from steel or glass-fiber-reinforced plastic. Stranding elements 3, 4, and 5 are disposed concentrically and coaxially in one layer around the central element 2. A wound wrapping 6 encloses the stranding elements 3, 4, and 5. A composition (petrolatum) that fills the gaps in the core assures that invading water will not spread longitudinally within the cable 1. The cabling elements of the cable core illustrated herein are a so-called copper quad 3, a dummy element 4 made for instance from polyethylene (PE), and three bundle strands 5. Each of the bundle strands 5 comprises a plastic casing and a plurality of optical waveguide fibers 7 disposed in the casing and fixed therein with a thixotropic gel. The tension-absorbing/tension-relieving elements may be suitable aramide fibers and yarns 8. They are disposed between the core wrapping 6 and a black cable sheath 9.

Figure 2:
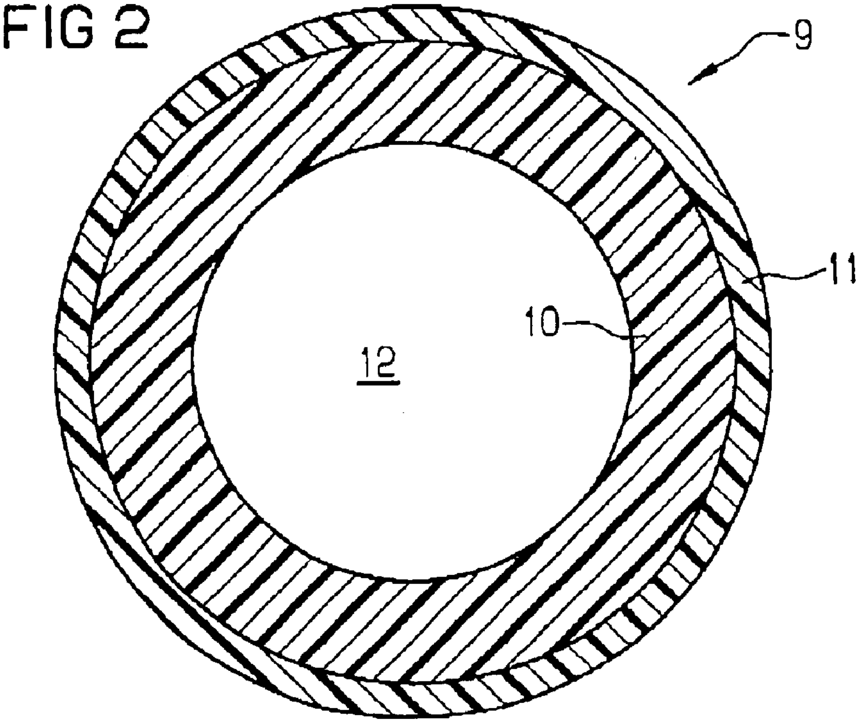
FIG. 2 is a cross-section of the laser-markable sheath of the outer cable according to the invention.

As shown by the cross section in FIG. 2, which is not to scale, the sheath 9 of the communications cable 1 is constructed in layered fashion. The inner layer 10, with a thickness d=2 mm, of the sheath 9 toward the core preferably comprises a carbon-blacked polyethylene, in particular a polyethylene copolymer (polyethylene-ethylene vinyl acetate), whose carbon content is 1 to 3 weight %, and in particular 2.5±0.5 weight %, for instance. An outer layer is only about 0.1 to 1.0 mm thick, and preferably 0.05 to 0.2 mm. The material for the outer layer 11 may be polyethylene (PE), or polypropylene (PP), which adheres well to the polyethylene inner layer 10.

The outer sheath layer 11 serving as the marking surface also has soot admixed with it as a dye; the proportion of carbon black is in the range from 0.2 to 0.8 weight %, in particular 0.2 to 0.5 weight %, and preferably in the range from 0.3 to 0.4 weight %. Both sheath layers 10/11, each dyed black, are applied by extrusion to the cable core and welded to one another. If the layers 10/11 acting as the cable sheath 9 are of different materials, then an adhesion promoter or a hot-melt or two-component adhesive serves to bond them solidly.

To mark the cable sheath 9 with numbers, letters, characters, symbols and so forth, its outer layer 11 is acted upon by electromagnetic radiation at a wavelength of 500 nm$\leqq\lambda\leqq$1200 nm. A pulsed Nd:YAG laser, in particular, may be used as a photon source (wavelength: $\lambda$=1064 nm or frequency-doubled $\lambda$=532 nm; laser power: 90 watts; pulse repetition frequency: 20–50 kHz). The projection system is advantageously a computer-controlled deflector unit and a projecting optical system. In this context, see for instance, the above-mentioned text by Kohler and the German application DE 31 47 230 A1. The deflector unit can in particular comprise two mirrors rotatable about orthogonal axes and corresponding driver electronics. The carbon content and the thickness of the outer sheath layer 11 are selected such that this layer completely absorbs the incident laser radiation. Accordingly, the laser radiation does not reach the sheath layer 10 toward the core, and so the mechanical stability and tightness of this layer are preserved.

As a consequence of the high energy input, the outer sheath material melts in the region of the laser focus. Since the carbon contained in the soot combusts at the same time to form $CO_2$, a largely soot-free, foamlike structured region is created, which very markedly scatters incident light. The region of the outer sheath layer 11 scanned with the laser probe thus looks like a white surface on a black background.

It will be readily understood that the exemplary embodiment described in the foregoing should in no way limit the scope of the invention. The inventive concept, by way of example, also encompasses the following and additional applications:

- to sheath the core of an electrical communications or current-carrying cable, coaxial cable, strand having an electric conductor, optical waveguide strand, or optical waveguide bundle strands, in the manner described, in which case the inner layer of the sheathing need not necessarily contain soot or graphite (naturally colored material);
- to embody the inner layer of the sheathing in layered form;
- to coat a cable sheath, coaxial cable or strand with a material that adheres well, and that contains the aforementioned proportion of soot or graphite, and then to mark the material by irradiation with photons;
- to provide the sheathing with tension-relieving and/or tension- absorbing elements (aramide yarns, steel wires, etc.);
- to use the sheathing as a hose or tube (water hose, pipe for floor heating, and so forth), in which the inner layer of the suitably dimensioned, adequately thick sheathing need not necessarily contain soot or graphite;
- instead of the high, medium or low density polyethylene (HDPE, MDPE, LDPE) or polypropylene, to use another plastic which is transparent or at least translucent to radiation at the wavelength of 500 nm$\leqq\lambda\leqq$1200 nm;
- to use PVC (polyvinyl chloride), PA (polyamide), FEP (fluorinated ethylene-propylene copolymer), PFA (perfluoroalkoxy copolymer) or EVA (ethylene vinyl acetate) as the sheath material;
- to mix stabilizers and aging protectants (antioxidants, light protection agents, UV absorbers, and so forth) in with the sheath materials;

to sheathe even non-elongated or non-strandlike objects in the manner described, or to provide them with a plastic layer having the aforementioned soot/graphite content and then mark them by irradiation with photons.

We claim:

1. A communication cable having a sheathing, the sheathing comprising:

a first layer of a first material containing a first proportion of a dye admixed with said first material, and bounding a core of said communication cable;

a second layer adjacent said first layer, said second layer forming an exterior surface having a marking face marked by irradiation with photons, and said second layer being formed of a second material and containing a second proportion of the dye smaller than said first proportion of dye which is admixed with the second material, said second proportion of dye associated with said second layer being selected to cause a color change upon irradiation with photons by melting an irradiated region, thereby forming a foamed $CO_2$ region that scatters incident light.

2. The communication cable having the sheathing according to claim 1, wherein said second material is one of translucent and transparent for the radiation used for marking.

3. The communication cable having the sheathing according to claim 1, wherein at least one dimension selected from the group consisting of said second proportion of dye associated with said second layer and a thickness of said second layer is adjusted such that said second layer completely absorbs the radiation used for marking.

4. The communication cable having the sheathing according to claim 1, wherein said dye in said first and second layers is carbon material selected from the group consisting of soot and graphite.

5. The communication cable having the sheathing according to claim 4, wherein the proportion of said carbon material in said second layer is in a range from 0.2 to 0.8% by weight.

6. The communication cable having the sheathing according to claim 4, wherein the proportion of said carbon material in said second layer is in a range from 0.2 to 0.5% by weight.

7. The communication cable having the sheathing according to claim 3, wherein the thickness of said second layer is in a range from 0.01 to 1.0 mm.

8. The communication cable having the sheathing according to claim 7, wherein the thickness of said second layer is in a range from 0.05 to 0.2 mm.

9. The communication cable having the sheathing according to claim 4, wherein the proportion of said carbon material in said first layer is in a range from 1 to 3% by weight.

10. The communication cable having the sheathing according to claim 1, wherein said first layer and said second layer are formed of the same material.

11. The communication cable having the sheathing according to claim 1, wherein at least one of said first layer and said second layer are formed of a synthetic material selected from the group consisting of thermoplastic material, viscoelastic material, and an elastomer.

12. The communication cable having the sheathing according to claim 1, wherein said first layer and said second layer are one of welded, glued, and joined together by an adhesion promoter.

13. A sheathing article, comprising:

a sheathing separating an interior from an exterior, and having an exterior layer;

said exterior layer being transparent to a radiation used for marking said exterior layer, and containing a proportion of a dye selected from the group consisting of soot and graphite that is admixed with said sheathing; and a plurality of predetermined characteristics of said exterior layer being selected from the group consisting of a thickness of the exterior layer and the proportion of said dye, the plurality of predetermined characteristics selected such that said exterior layer absorbs the radiation used for marking completely, and a color change results within an irradiated region upon irradiation by melting the irradiated region, thereby forming a foamed $CO_2$ region that scatters incident light.

14. The sheathing according to claim 13, wherein said exterior layer is translucent to the radiation used for the marking.

15. The sheathing according to claim 13, wherein the proportion of the dye is at least 0.2% by weight and at most 0.8% by weight.

16. The sheathing according to claim 13, wherein the thickness of said exterior layer is between 0.01 and 1.0 mm.

17. The sheathing according to claim 13, wherein the thickness of said exterior layer is between 0.05 to 0.2 mm.

18. The sheathing according to claim 13, wherein said exterior layer is formed of a synthetic material selected from the group consisting of thermoplastic material, viscoelastic material, and an elastomer.

19. The sheathing according to claim 13, wherein said exterior layer has materials selected from the group consisting of stabilizers and aging protectants admixed therewith.

20. The sheathing according to claim 1, wherein at least one of said first and second materials selected from the group consisting of stabilizers and aging protectants admixed therewith.

* * * * *